EDWARD MAYNARD, OF WASHINGTON, DISTRICT OF COLUMBIA.

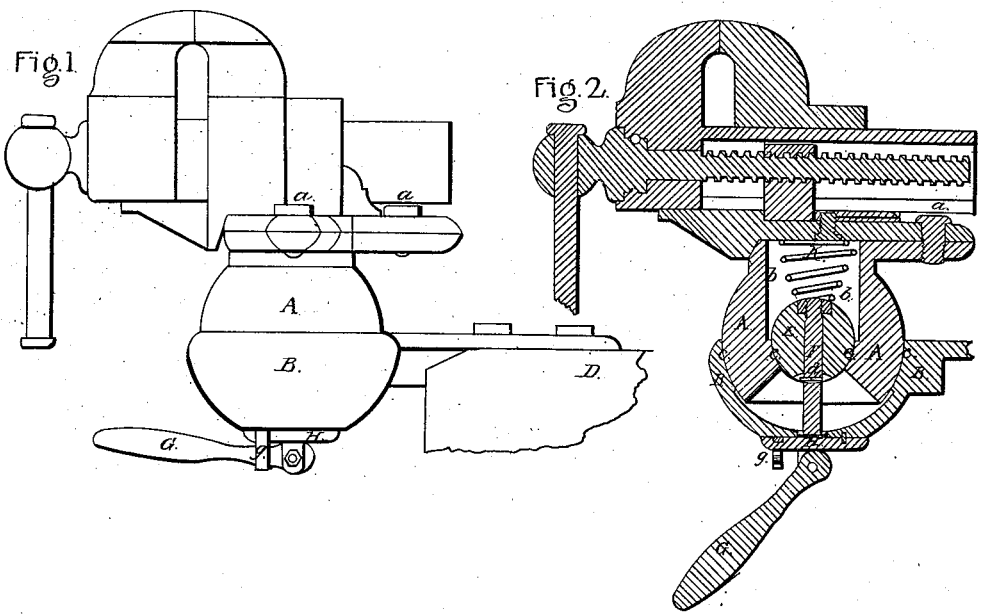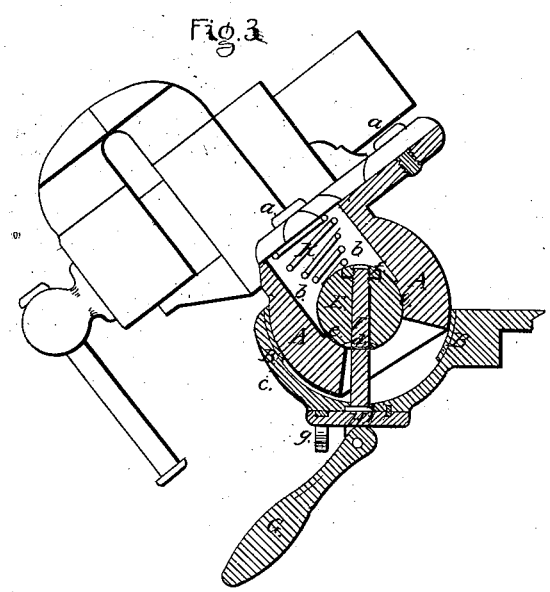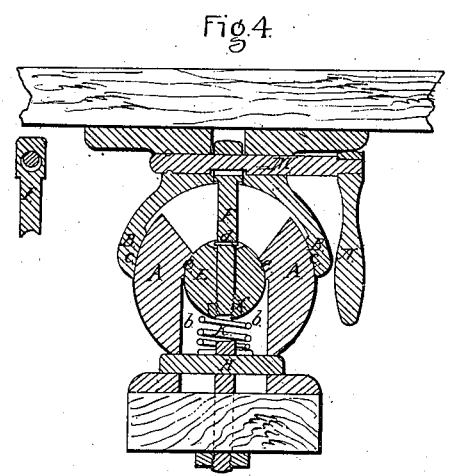

Letters Patent No. 86,173, dated January 26, 1869.

IMPROVED BALL-AND-SOCKET JOINT.

The Schedule referred to in these Letters Patent and making part of the same.

*To all whom it may concern:*

Be it known that I, EDWARD MAYNARD, of the city of Washington, in the District of Columbia, have invented a new and useful Improvement in Ball-and-Socket Joints; and I do hereby declare the following to be a full and exact description thereof, reference being had to the accompanying drawings, forming a part of this specification, in which—

Figure 1 is an elevation, and

Figure 2, a central vertical section of my improved ball-and-socket joint, as applied to a vise.

Figure 3, a central vertical section of the same, illustrating its operation, and Figure 4, a similar section, illustrating a reverse position of the joint as applied to a mapping-table.

Similar letters of reference indicate like parts in all of the figures.

My invention relates to an improvement in ball-and-socket joints for vises, mapping-tables, compasses, and other tools or instruments.

It consists in a novel method of fastening and holding the joint in any desired position or at any angle, by means of a fixed immovable sphere or spherical surface, either continuous or annular, resting in an annular bearing formed concentrically within the ball of the joint, and secured to a rod, which, extending through an enlarged opening in the ball, passes out centrally through the socket thereof, and is operated upon by a cam-lever or other device, serving to draw it and its attached inner sphere or spherical surface very tightly into its concentric seat within the ball, and thus force and compress the ball itself so closely into its socket as to prevent any further movement thereof.

An annular seat or bearing-surface is formed just within the margin of the socket, to receive the ball, and thus make a perfectly smooth, close-fitting joint between the two, so that when they are clamped together they will become immovable, because of the intimate contact of every portion of the opposite bearing-surfaces.

In the accompanying drawings—

A represents the ball;

B, the socket forming my improved joint.

Exteriorly, they are of the usual form, and may be secured to any description of instrument or device in the customary manner.

In figs. 1, 2, and 3 of the drawings, I have represented the ball A as supporting a vise, C, secured thereto by screws *a a*, the socket B being fastened to a work-bench, D, in the usual manner.

The ball A of the joint, instead of being left solid, is perforated centrally with an enlarged aperture, *b*.

This aperture extends into the ball cylindrically, until it reaches the centre thereof, where it contracts, to form an annular-concaved or spherical seat or bearing-surface, *e*, concentric with the outer surface of the ball, and then widens radially therefrom, to form an enlarged opening, extending to the outer circumference of the ball, in the form of a spherical sector, as illustrated in figs. 2 and 3 of the drawings.

A small solid sphere or ball, E, is inserted through the cylindrical portion of the aperture *b*, to rest upon the annular concentric seat *e*; and the threaded end of a rod, F, extending centrally through an aperture in the socket B, is made to pass through a central aperture in this sphere, and secured by means of a nut, *f*, screwing thereon.

If desired, a recess may be countersunk in the ball, to receive the nut, as illustrated in the drawings.

A pin, *d*, inserted through the rod F, engaging in a recess in the ball, serves to prevent the rod from turning, in screwing or unscrewing the nut *f* thereon.

The end of the rod F extending through the socket B is divided or forked, and the enlarged head of a lever, G, is pivoted eccentrically within the fork.

A steel bar or key, H, is inserted through the fork, under the head of the lever G, so that the ends thereof shall bear against the bottom of the socket to which they may be secured.

Hence, by turning the lever G, its eccentric head will operate as a cam, and bearing against the key-plate H, will draw and force the rod F outwardly with great power, drawing down its attached sphere E into its annular concentric socket *e*, communicating thereby the pressure of the cam to the ball A, so as to force it so tightly into its bearings in the socket B as to prevent any movement thereof therein.

The head of the lever G is so pivoted (eccentrically) in the fork or slot of the rod F, as that, when the outer end of the lever is drawn up against the socket, as illustrated in fig. 1, the rod F is left loose; but by throwing down the end of the lever, the cam-head will bear against the key-plate H, and draw down the rod.

The end of the lever may be held up in its free position by means of a spring or other catch, *g*, fig. 1.

Instead of allowing the entire surface of the ball A to be in contact with its socket B, I form an annular bearing, *c*, just within the margin of the socket, (either homogeneous with the socket or out of Babbit or other suitable metal or composition,) which will embrace a portion of the surface of the ball alone, and I thereby secure a more close, resisting, and perfect joint between the two.

A spiral or other equivalent spring, K, inserted in the cylindrical portion of the aperture *b*, within the ball A, between the inner sphere E and the plate closing the opening outwardly, will serve, by its pressure upon the sphere E, to stiffen the joint of the ball A sufficiently to prevent a loose movement thereof when not influenced or secured by the operation of the cam-lever G.

The movement of the ball A in its socket B is limited by the dimensions of the enlarged portion of the aperture *b*, exterior to the seat *e* of the inner sphere, through which the rod F passes.

As this portion of the opening is made the counterpart of a spherical sector, the ball is left free to revolve and to incline in any direction, being limited only by the extent of the arc embraced by the opening, as illustrated in fig. 3.

In fig. 4, I have illustrated the ball-and-socket joint in a reversed position, the socket being placed uppermost, and secured to a mapping-table, and the ball secured to the stand beneath by a rod and nut.

In such case, the operation of the clamping-rod F upon the clamping-sphere E is obtained by means of a horizontal rod or shaft, M, passing through an aperture in the neck of the socket B, and through an eye upon the upper outer end of the clamping-rod.

An eccentric or cam is cut upon that portion of the shaft passing through the eye of the rod F, and the shaft is made to turn, so as to bring its eccentric portion to bear against the outer portion of the eye, to draw the rod, by means of a handle, N, secured to one end thereof, as illustrated in fig. 4.

I contemplate the use of the simple segment of a sphere in combination with the annular concentric seat e, formed in the ball A, instead of a complete solid sphere, E, to confine the movements of the ball in its socket, as described.

I also contemplate the substitution of a screw or screw-actuated cam for the simple cam-lever G, (or shaft M,) in operating the rod F actuating the sphere E.

Having thus fully described my invention,

I claim therein as new, and desire to secure by Letters Patent—

1. The ball-and-socket joint, consisting of the concentric seat formed within the ball, and a sphere or segment of a sphere within the seat, and attached to a rod extending outwardly therefrom, through an aperture in the ball and its socket, adjusted and secured by means of the cam, all substantially in the manner and for the purpose herein set forth.

2. The combination of the spring with the inner sphere or spherical segment placed within the ball of a ball-and-socket joint, substantially as and for the purpose herein set forth.

3. An annular seat or bearing, in combination with the socket of a ball-and-socket joint, substantially as and for the purpose herein set forth.

EDWARD MAYNARD.

Witnesses:
DAVID A. BURR,
WM. H. ROWE.